(12) United States Patent  
Russ et al.

(10) Patent No.: US 9,499,230 B1  
(45) Date of Patent: Nov. 22, 2016

(54) FIXATION ADAPTER FOR HANDLEBAR

(71) Applicant: Sensata Technologies, Inc., Attleboro, MA (US)

(72) Inventors: Benjamin Russ, Berlin (DE); Michael Stoffers, Berlin (DE)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 14/722,542

(22) Filed: May 27, 2015

(51) Int. Cl.
*B62K 11/14* (2006.01)

(52) U.S. Cl.
CPC ..................... *B62K 11/14* (2013.01)

(58) Field of Classification Search
CPC .............. B62K 11/14; B62K 21/125; B62K 23/00; B62K 23/02; B62J 6/16; B62J 11/00; B62J 2099/004; F16B 7/04; H01H 9/0207; H01H 9/06; H01H 2009/068
See application file for complete search history.

(56) References Cited

U.S. PATENT DOCUMENTS

| | | | | |
|---|---|---|---|---|
| 4,307,625 A * | 12/1981 | Lauzier | .................. | B62K 11/14 74/489 |
| 4,479,693 A * | 10/1984 | Uyeda | .................. | H01R 13/627 439/527 |
| 5,386,961 A * | 2/1995 | Lu | ............................ | B62H 5/00 224/425 |
| 6,631,656 B2 * | 10/2003 | Ase | ............................ | B62J 6/16 74/551.8 |
| 6,716,140 B2 * | 4/2004 | Cheng | ................ | A63B 71/0622 248/904 |
| 7,780,321 B1 * | 8/2010 | Retief | ........................ | B62J 6/02 362/474 |
| 8,357,864 B2 * | 1/2013 | Murasawa | ............. | B60K 20/06 200/61.88 |
| 8,763,746 B2 * | 7/2014 | Tozuka | .................... | H01H 9/06 180/315 |
| 2014/0284187 A1* | 9/2014 | Kikuchi et al. | ......... | B62K 11/14 200/61.85 |

* cited by examiner

*Primary Examiner* — Adam D Rogers
(74) *Attorney, Agent, or Firm* — Chapin Intellectual Property Law, LLC

(57) ABSTRACT

Methods and apparatus for a fixation adapter for a handlebar. An apparatus includes a fixation adapter mounted on a handlebar, the fixation adapter including a body having a pin on a bottom surface to secure the body to the handlebar and a latch on a top surface to fixedly lock to a control unit housing, and the control unit housing slidably mounted to the fixation adapter, the control unit housing including a mounting area for mating to the latch of fixation adapter.

7 Claims, 4 Drawing Sheets

FIXATION ADAPTER FOR HANDLEBAR

BACKGROUND OF THE INVENTION

The invention relates generally to adapters, and more specifically to a fixation adapter for a handlebar.

In general, control units contained within a metal or plastic housing are often mounted and clamped to bars using a screwed metal bracket and used for a number of different applications, such as motorcycle controls on a handlebar, snowmobile controls on a handle bar, tricycle controls on a handlebar, agricultural equipment controls on a handlebar, and so forth. For example, a control units within a housing mounted on a motorcycle handlebar may contain controls to enable an occupant of a motorcycle to turn on or off a headlight, turn signals, and/or perform related operations with his or her hands left on the handlebar.

One disadvantage of this type of mounting onto a handlebar is that space is needed for the clamp and securing screws. In addition, sensitive internal components within the housing may be subject to deformation that is dependent upon the tension caused by clap screwing (e.g., over tightening with a screw driver), which may effect a haptic of buttons and/or rockers, for example, contained on the housing.

What is needed is a simple fixation adapter that optimizes internal space and realizes a quick solid mounting without the need of tools.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus for a fixation adapter for a handlebar.

In an aspect, the invention features an apparatus including a fixation adapter mounted on a handlebar, the fixation adapter including a body having a pin on a bottom surface to secure the body to the handlebar and a latch on a top surface to fixedly lock to a control unit housing, and the control unit housing slidably mounted to the fixation adapter, the control unit housing including a mounting area for mating to the latch of fixation adapter.

In another aspect, the invention features a method including securing a fixation adapter to a handlebar, the fixation adapter including a body having a pin on a bottom surface to secure the body to the handlebar and a latch on a top surface to fixedly lock to a control unit housing, securing two half shells of the control unit housing around the handlebar, and sliding the control unit housing along the handlebar to mate with the fixation adapter, the control unit housing including a mounting area for mating to the latch of fixation adapter.

Embodiments of the invention may have one or more of the following advantages.

Use of a fixation adapter in conjunction with a control unit housing optimizes useable space within the control unit housing and enables a quick solid mounting of the control unit housing on to the handlebar without tools.

Optimizing useable space within the control unit housing enables the positioning of extra switch functions or conductor board without increasing an overall size of the control unit housing.

Use of a fixation adapter in conjunction with a control unit housing enables assembly and assembly of the control unit housing and its components before customer delivery.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1A:
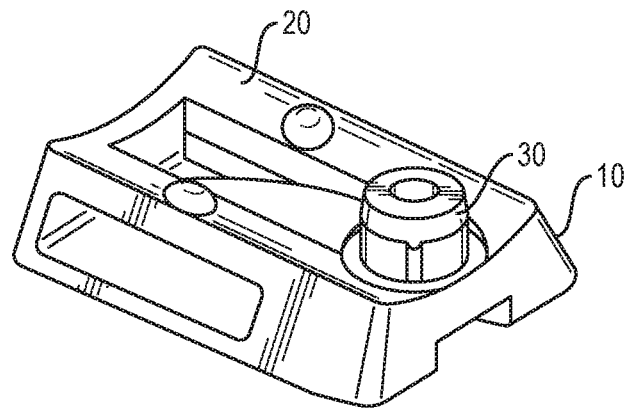
FIG. 1A is an illustration of a top portion of an exemplary fixation adapter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In the description below, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1A, an exemplary fixation adapter 10 includes a top portion 20. The top portion 20 is shaped in a contour fashion to match a diameter of a round handlebar (not shown) and includes a pin 30. The pin 30 is a small projection in the top portion 20. The pin 30 fits into a corresponding hole in the round handlebar (not shown), which is used to secure the fixation adapter 10 to the handlebar. In embodiments, the fixation adapter 10 may be constructed of a metal or a polymeric material, such as plastic.

Figure 1B:
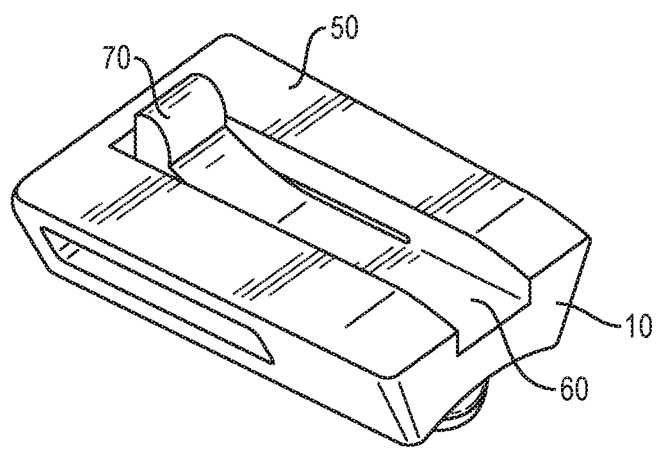
FIG. 1B is an illustration of a bottom portion of the exemplary fixation adapter of FIG. 1A.

As shown in FIG. 1B, the fixation adapter 10 also includes a bottom portion 50. The bottom portion 50 include a channel 60 containing a latch 70. The latch 70 is capable of being depressed within the channel 60 and rebound. More specifically, the latch 70 depresses when a control unit housing is slid along the handlebar over the latch 70 and the latch 70 rebounds and locks into place in a corresponding mounting area of the control unit housing, more fully described below.

Figure 2:
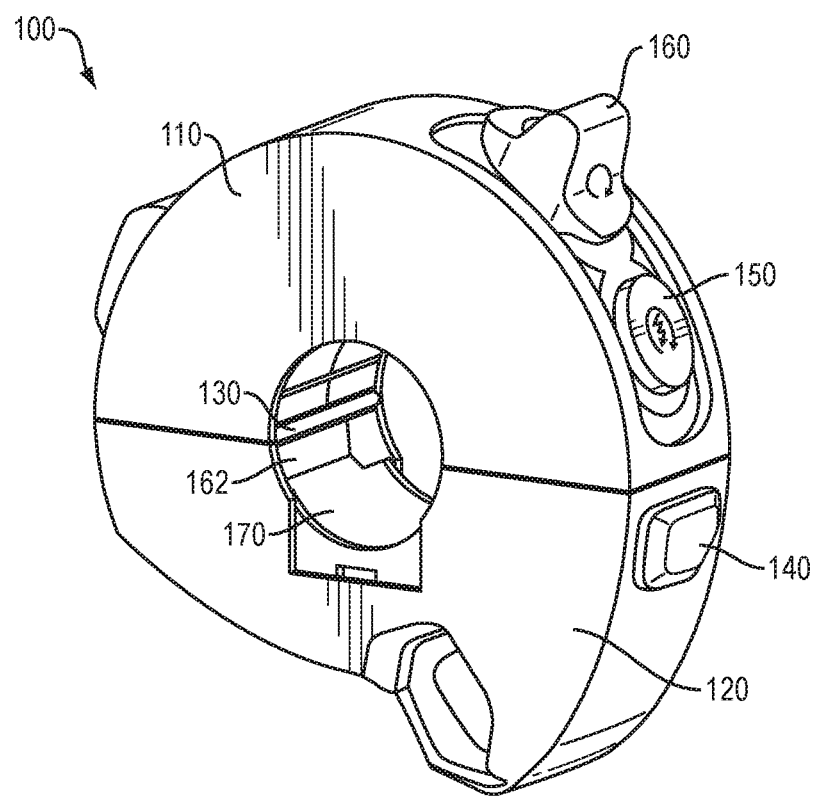
FIG. 2 is an illustration of two shell parts of an assembled control unit housing.

As shown in FIG. 2, an exemplary assembled control unit housing 100 includes two shell parts 110, 120. The two shell parts 110, 120 are secured together with, for example, one or more screws, and placed around a handlebar. Once screwed together, a vibration damper 130 rests against the handlebar. In an embodiment, the vibration damper 130 is constructed from rubber. In an embodiment, the two shell parts 110, 120 include one or more switches 140, 150, 160. The one or more switches 140, 150, 160 may be used for operation of various electric parts, such as, for example, a headlight, a horn and/or a turn signal.

In embodiments, contained within the assembled control unit housing 100 may be an inner carrier housing a printed circuit board (PCB) 162 for connection to the one or more switches 140, 150, 160.

The control unit housing 100 also includes a mounting area 170. The mounting area 170 has a geometry that matches a geometry of the bottom portion 50 of the fixation adapter 10 such they may be joined together, more fully described below.

In embodiments, the control unit housing 100 and/or one or more switches 140, 150, 160 are constructed from metal or polymeric material, such as plastic.

Figure 3A:
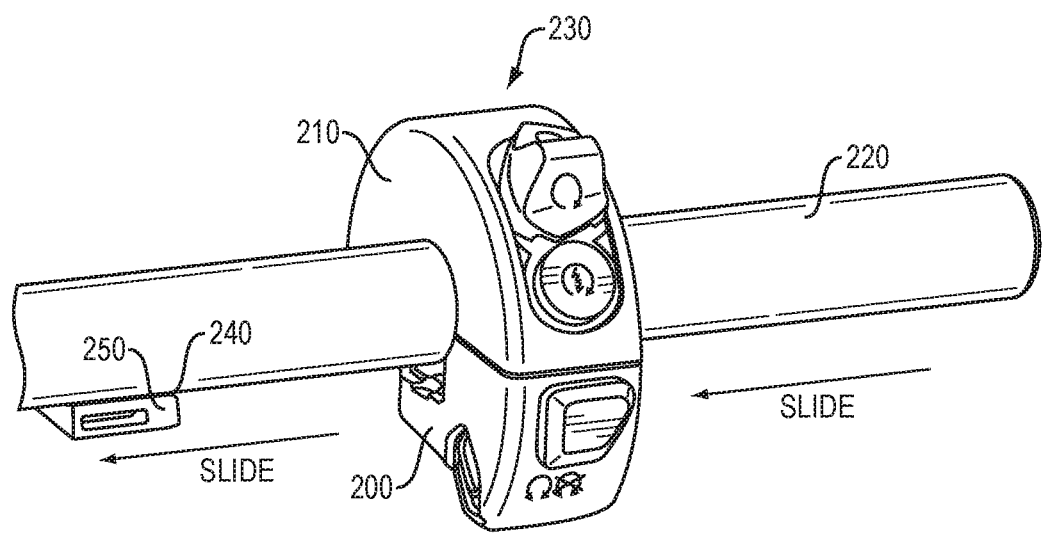
FIG. 3A is an illustration of an assembled control unit housing and fixation adapter mounted on a handlebar.

As shown in FIG. 3A, a shell part 200 and a shell part 210 are secured together to form an assembled control housing 230. A bottom portion 240 of a fixation adapter 250 is secured to the handlebar 220. The assembled control housing 230 is slid or moved along a handlebar 220 until positioned over the fixation adapter 250, which locks the assembled control housing 230 onto the handlebar 220 and prevents it from rotated around the handlebar 220 or moving along the handlebar.

Figure 3B:
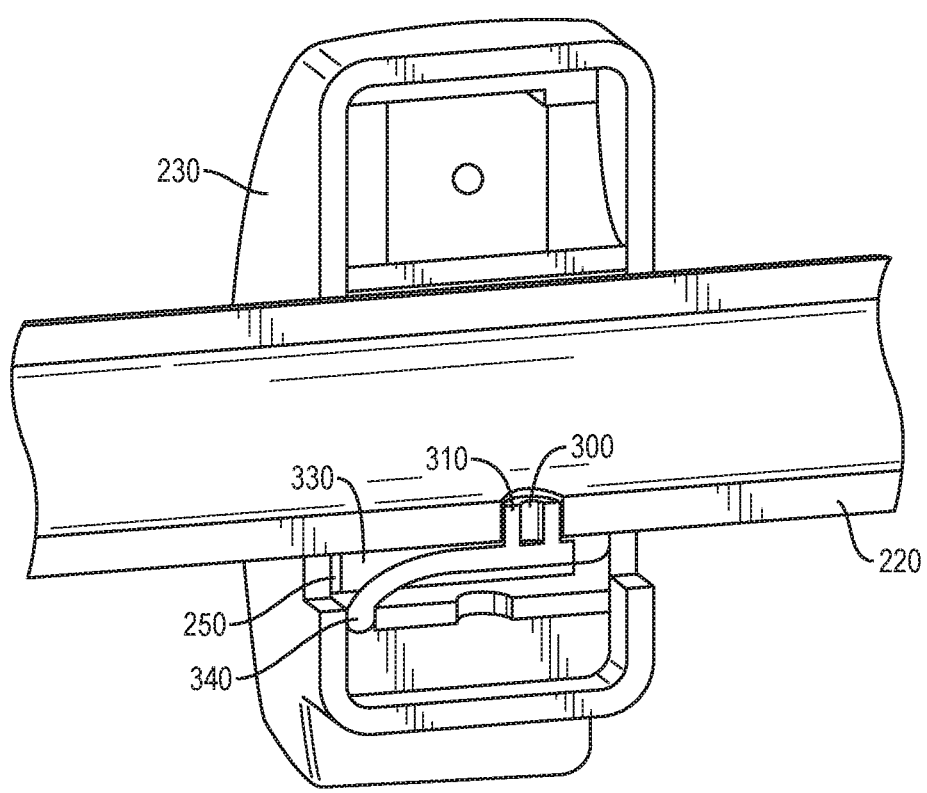
FIG. 3B is an illustration of a front prospective of one of the two shell parts of the control unit housing of FIG. 3A.

As shown in FIG. 3B, a cross section of the assembled control housing 230 illustrates its attachment to fixation adapter 250. More particularly, a pin 300 of the fixation adapter 250 fits into a corresponding hole 310 in the handlebar 220. When the control unit housing 230 is moved over the fixation adapter 250, a latch 340 on the fixation adapter 250 depresses and then rebounds when it mates with a mounting area 330 of the control unit housing 230, locking the control unit housing 230 to the fixation adapter 250.

In summary, the fixation adapter 250 realizes a non-positive connection between the control unit housing 230 and the handlebar 220. The fixation adapter 250 is positioned inside the control unit housing 230 by its outer shape and is locked by the latch 340. A connection between the handlebar 220 and the fixation adapter 250 is implemented by the pin 300.

In an embodiment, the control unit housing 230 my be removed from the handlebar 220 by releasing the latch 340 from the mounting area 330 by placing using a tool (not shown) into the channel 60 (in FIG. 1B).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. An apparatus comprising:
   a fixation adapter mounted on a handlebar, the fixation adapter comprising a body having a pin on a bottom surface to secure the body to the handlebar and a latch on a top surface to fixedly lock to a control unit housing; and
   the control unit housing slidably mounted to the fixation adapter, the control unit housing comprising a mounting area for mating to the latch of the fixation adapter, the control unit housing further comprising two half shells fixedly joined together with screws or snapped together.

2. The apparatus of claim 1 wherein the control unit housing further comprises:
   a vibration damper;
   an internal printed circuit board (PCB); and
   a plurality of operating switches protruding from the control unit housing, each of the plurality of switches linked to the internal printed circuit board (PCB) for operation of various electric parts.

3. The apparatus of claim 2 wherein the plurality of switches for operation of various electric parts at least include an optical axis changeover switch for a headlight, a horn switch and a turn signal switch.

4. The apparatus of claim 3 wherein the vibration damper is positioned against an outer surface of the handlebar.

5. A method comprising:
   securing a fixation adapter to a handlebar, the fixation adapter comprising a body having a pin on a bottom surface to secure the body to the handlebar and a latch on a top surface to fixedly lock to a control unit housing;
   securing two half shells of the control unit housing together; and
   sliding the control unit housing along the handlebar to mate with the fixation adapter, the control unit housing comprising a mounting area for mating to the latch of the fixation adapter, the control unit housing further comprising:
   a vibration damper;
   an internal printed circuit board (PCB); and
   a plurality of operating switches protruding from the control unit housing, each of the plurality of switches linked to the internal printed circuit board (PCB) for operation of various electric parts.

6. The method of claim 5 wherein the plurality of switches for operation of various electric parts at least include an optical axis changeover switch for a headlight, a horn switch and a turn signal switch.

7. The method of claim 5 wherein the vibration damper is positioned against an outer surface of the handlebar.

* * * * *